(12) United States Patent
Laffoley

(10) Patent No.: US 7,929,794 B2
(45) Date of Patent: Apr. 19, 2011

(54) METHOD AND APPARATUS FOR IMAGE DATA COMPRESSION

(75) Inventor: Brian Laffoley, Fife (GB)

(73) Assignee: STMicroelectronics (Research & Development) Limited, Marlow-Buckinghamshire (GB)

( * ) Notice: Subject to any disclaimer, the term of this patent is extended or adjusted under 35 U.S.C. 154(b) by 928 days.

(21) Appl. No.: 11/833,416

(22) Filed: Aug. 3, 2007

(65) Prior Publication Data

US 2008/0031533 A1    Feb. 7, 2008

(30) Foreign Application Priority Data

Aug. 4, 2006   (EP) .................................... 06270076

(51) Int. Cl.
*G06K 9/36*   (2006.01)
(52) U.S. Cl. ...................................................... 382/239
(58) Field of Classification Search .......... 382/232–233, 382/236–251; 358/426.1–426.14; 348/384.1, 348/387.1, 406.1, 420.1–421.1, 430.1; 375/240.01–240.24
See application file for complete search history.

(56) References Cited

U.S. PATENT DOCUMENTS

| | | | |
|---|---|---|---|
| 6,792,153 B1 * | 9/2004 | Tsujii | 382/239 |
| 7,747,097 B2 * | 6/2010 | van Baarsen et al. | 382/248 |
| 2004/0028139 A1 | 2/2004 | Zaccarin et al. | 375/240.24 |

OTHER PUBLICATIONS

Abraham et al., Bandwidth-Aware Video Encoding with Adaptive Image Scaling, Proceedings of the 2004 IEEE International Conference on Multimedia and Expo, vol. 1, Jun. 27, 2004.

* cited by examiner

*Primary Examiner* — Jose L Couso
(74) *Attorney, Agent, or Firm* — Lisa K. Jorgenson; Allen, Dyer, Doppelt, Milbrath & Gilchrist, P.A.

(57) ABSTRACT

An image data file undergoes compression, such as JPEG compression. The size of the resulting compressed file is compared with a file size limit. If the file size limit is exceeded, then the compression factor may be increased. A scaler reduces the image pixel resolution if the required compression factor would otherwise exceed a predetermined limit. This may prevent a high degree of compression from providing an image of poor visual quality.

18 Claims, 1 Drawing Sheet

METHOD AND APPARATUS FOR IMAGE DATA COMPRESSION

FIELD OF THE INVENTION

The present invention relates to image compression systems, and in particular, to compression of image data for storage or transmission.

BACKGROUND OF THE INVENTION

Image compression systems are well known. The invention will be described with particular reference to the JPEG system, but may also be used with other systems. JPEG compression is commonly used in applications such as cameras. In cameras incorporated in mobile phones, there are severe memory limitations and the camera system is set up to impose a limit on the size of a compressed image. The size of the limit is chosen based on the specifications of the phone and its camera system, but a typical value is 12 kb. It will be appreciated that this value could be lower or higher based on the specification of the phone. The value could be different by an order of magnitude when referring to other devices.

Such limits can be imposed by forming a compressed image at a first compression factor, comparing the byte size of the compressed image against the size limit, and if the size limit is exceeded, then forming a second compressed limit at a higher compression factor.

Many scenes will give an acceptable image within such a limit, but where a scene contains a significant amount of fine detail the resulting compressed image will frequently be of an unacceptable quality, with the image being formed of excessively large pixels. A similar problem can exist as a result of low light levels rather than excessive detail.

SUMMARY OF THE INVENTION

In view of the foregoing background, an object of the present invention is to overcome or mitigate such problems, and to automatically adjust the processing of the image data to produce a more visually acceptable result.

This and other objects, advantages and features are provided by a method of forming a compressed image comprising the steps of:

(a) subjecting image data representing a source image to a compression algorithm having a controllable degree of compression to form a compressed image;

(b) comparing the data size of the compressed image with a predetermined limit Value; and (c) if the data size of the compressed image exceeds the limit value, then increasing the degree of compression and repeating steps (a) and (b).

In particular, the source image may be selectively scaled to a reduced pixel resolution before being subjected to the compression algorithm when a predetermined condition applies. The predetermined condition may be that step (c) would call for a degree of compression above a predetermined threshold. Alternatively, the predetermined condition may be that the light level is below a predetermined threshold. Both conditions may be applied simultaneously.

The compression algorithm may typically be a still image compression algorithm, suitably the JPEG algorithm. However, the method is also applicable to video images, and may advantageously be carried out within a digital camera.

Another aspect is directed to an apparatus for forming a compressed image comprising:

(a) image compression means or an image compressor for forming a compressed image from image data representing a source image by applying a compression algorithm having a controllable degree of compression; and (b) comparison means or a comparator for comparing the data size of the compressed image with a predetermined limit value, and for generating a compression control signal if the data size of the compressed image exceeds the limit value to increase the degree of compression.

A scaler may be interposed between the source image and the image compression means and may be selectively operable to reduce the pixel resolution of the image whenever a predetermined condition applies. The scaler may be controlled by the comparison means to reduce the pixel resolution whenever the comparison means would generate a compression control signal calling for a degree of compression above a predetermined threshold. Alternatively or additionally, the scaler may be controlled by light intensity measuring means or a light intensity measurer to reduce the pixel resolution whenever the light intensity is below a predetermined threshold.

The apparatus may be embodied in a co-processor for operation with an image sensing integrated circuit. The apparatus may typically be incorporated within an image sensor or a camera. A further aspect is directed to a mobile phone incorporating such a camera.

BRIEF DESCRIPTION OF THE DRAWINGS

An embodiment of the invention will now be described, by way of example only, with reference to the drawings, in which.

DETAILED DESCRIPTION OF THE PREFERRED EMBODIMENTS

Figure 1:
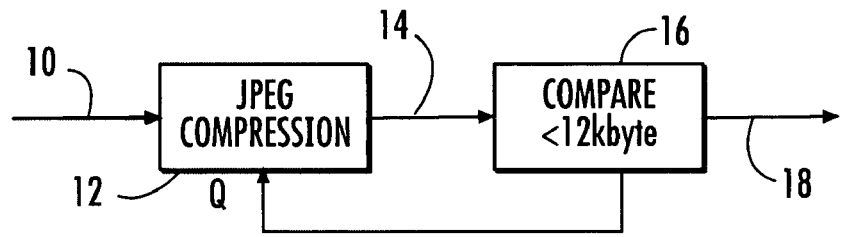
FIG. 1 is a block diagram of a compression system according to the prior art.

Referring to FIG. 1, in a known compression scheme, an image 10 is compressed at 12 according to a JPEG algorithm to produce a compressed image 14. The JPEG algorithm applies a degree of compression Q. The compressed image data is compared at 16 with a threshold size, for example 12 kb. If less than the threshold, the image data is output at 18 to a memory. If greater than the threshold, Q is increased to give a greater degree of compression and the comparison is repeated. As discussed above, if the image contains a large amount of fine detail, this process can lead to a result which is visually unsatisfactory.

Figure 2:
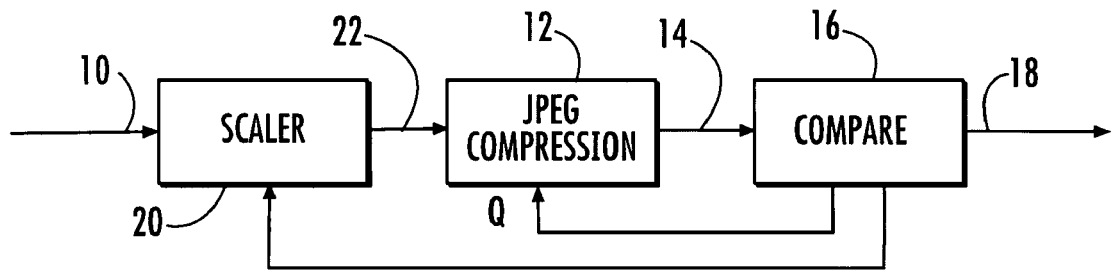
FIG. 2 is a block diagram of a compression system according to the present invention.

Referring now to FIG. 2, similar items are denoted by similar reference numerals. In this case however, the original image 10 is passed through a scaler 20 before undergoing compression. The scaler 20 defaults to applying zero scaling so that its output 22 is an image which is 1:1 with the input image 10. However, if the result of the comparison at 16 is such that a Q above a predetermined value would be required, the scaler 20 is operated to scale down the input image to have a smaller number of pixels to reduce the pixel resolution of the image. As one example, an input image which contains 1024 by 736 pixels might be reduced to 676 by 486 pixels.

The overall result of such an operation is that the reproduced image has a lower pixel resolution but significantly less compression artifacts, whereby the subjective visual quality to the end user is much more acceptable. The predetermined limit value of Q can readily be determined empirically.

The use of a scaler in this manner is a particularly convenient approach, as many image sensors and cameras incorporate a scaler as a standard facility, frequently for the purpose of matching a standard image sensor to a variety of screen sizes (for example in mobile phones). Therefore, in many instances it is possible to incorporate the illustrated scaler in existing devices with no or minimal extra circuitry.

Figure 3:
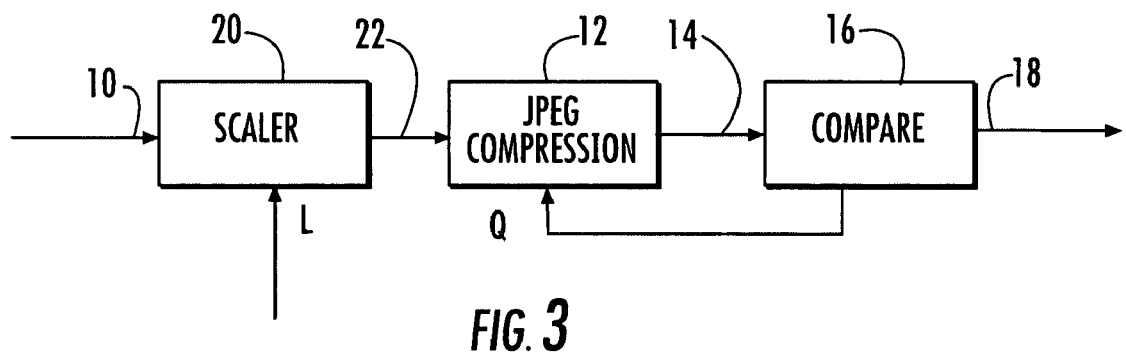
FIGS. 3 and 4 illustrate further embodiments of a compression system according to the present invention.

FIG. 3 illustrates a modification in which the scaler 20 is not controlled by the compression factor Q, but in accordance with light level L. Lower light levels cause the image signal to contain more noise across the image, and also noise on individual pixels which can cause undesirably high levels of compression. The effect of this can be reduced by scaling to a lower pixel resolution before compression.

Figure 4:
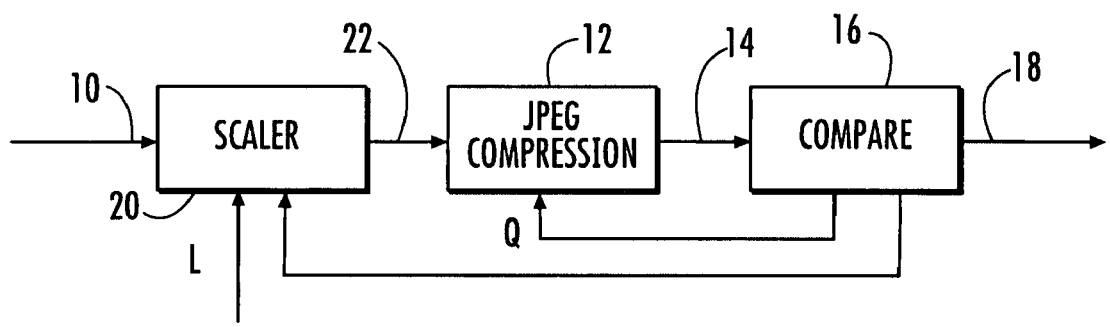

FIG. 4 illustrates a further modification in which scaling is controlled by both Q and L. A measurement of incident light level can readily be derived from pixel values of the image sensor itself, or from a separate light intensity sensor.

Although described with reference to JPEG compression of still images, the illustrated scaler may be applied to other types of image compression, for example GIF or PNG. The illustrated scaler could also be applied to video compression such as MPEG, but this would require the scaling to be reversed at the viewing end.

The illustrated apparatus may conveniently be implemented within the signal processing circuitry of a solid state image sensor, or of a camera, where the appropriate means for scaling and for compression will already be present. This is particularly useful for applications with limited memory available, such as cameras in mobile phones. The requisite circuitry can be formed in a co-processor arranged for operation with the image sensing IC, for example. It is also to be appreciated that the illustrated scaler can also be applied in other situations, such as in image processing or editing on a PC.

That which is claimed:

1. A method of forming a compressed image comprising:
   receiving a source image to be compressed;
   operating a processor to perform the following steps
      selectively scaling the source image to a reduced pixel resolution before being subjected to a compression algorithm;
      subjecting the source image with the reduced pixel resolution to the compression algorithm having a controllable degree of compression to form a compressed image;
      comparing a data size of the compressed image with a limit value, and if the data size of the compressed image exceeds the limit value, then increasing the degree of compression and repeating the above steps.

2. A method according to claim 1, wherein the source image is selectively scaled when the degree of compression is above a threshold.

3. A method according to claim 1, wherein the source image is selectively scaled when a light level as below a threshold.

4. A method according to claim 1, wherein the compression algorithm comprises a still image compression algorithm.

5. A method according to claim 1, wherein the compression algorithm comprises a JPEG algorithm.

6. A method according to claim 1, wherein the method is carried out within a digital camera.

7. An image compression system comprising:
   an input for receiving a source image; and
   a processor receiving the source image and configured to perform the following
      selectively scaling the source image to a reduced pixel resolution before being subjected to a compression algorithm,
      subjecting the source image with the reduced pixel resolution to the compression algorithm having a controllable degree of compression to form a compressed image, and
      comparing a data size of the compressed image with a limit value, and generating a compression control signal if the data size of the compressed image exceeds the limit value to increase the degree of compression.

8. An image compression system according to claim 7, wherein said processor generates the compression control signal when the degree of compression is above a threshold; and wherein selectively scaling the source image to the reduced pixel resolution is based on the compression control signal.

9. An image compression system according to claim 7, further comprising a light intensity measurer for measuring a light intensity; and wherein selectively scaling the source image to the reduced pixel resolution is based on the measured light intensity being below a threshold.

10. An image compression system according to claim 7, wherein the compression algorithm comprises a still image compression algorithm.

11. An image compression system according to claim 7, wherein the compression algorithm comprises a JPEG algorithm.

12. An apparatus comprising:
    an image sensor providing a source image; and
    a processor coupled to said image sensor and configured to perform the following steps
       selectively scaling the source image to a reduced pixel resolution before being subjected to a compression algorithm,
       subjecting the source image with the reduced pixel resolution to the compression algorithm having a controllable degree of compression to form a compressed image, and
       comparing a data size of the compressed image with a limit value, and generating a compression control signal if the data size of the compressed image exceeds the limit value to increase the degree of compression.

13. An apparatus according to claim 12, wherein said processor generates the compression control signal when the degree of compression is above a threshold; and wherein selectively scaling the source image to the reduced pixel resolution is based on the compression control signal.

14. An apparatus according to claim 12, further comprising a light intensity measurer for measuring a light intensity; and wherein selectively scaling the source image to the reduced pixel resolution is based on the measured light intensity being below a threshold.

15. An apparatus according to claim 12, wherein the compression algorithm comprises a still image compression algorithm.

16. An apparatus according to claim 12, wherein the compression algorithm comprises a JPEG algorithm.

17. An apparatus according to claim 12, wherein said image sensor and said processor are configured so that the apparatus is a camera.

18. An apparatus according to claim 17, wherein the camera is integrated in a mobile phone.

* * * * *

UNITED STATES PATENT AND TRADEMARK OFFICE
CERTIFICATE OF CORRECTION

| | | |
|---|---|---|
| PATENT NO. | : 7,929,794 B2 | |
| APPLICATION NO. | : 11/833416 | |
| DATED | : April 19, 2011 | |
| INVENTOR(S) | : Laffoley | |

It is certified that error appears in the above-identified patent and that said Letters Patent is hereby corrected as shown below:

Column 3, Line 58    Delete: "as"
                     Insert: --is--

Signed and Sealed this
Sixteenth Day of August, 2011

David J. Kappos
*Director of the United States Patent and Trademark Office*